(12) United States Patent
King et al.

(10) Patent No.: US 6,351,769 B1
(45) Date of Patent: *Feb. 26, 2002

(54) DYNAMIC BURN RACK MONITOR LISTENER SERVER

(75) Inventors: Robert King; Roger Wong, both of Austin, TX (US)

(73) Assignee: Dell USA, L.P., Round Rock, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,046

(22) Filed: Dec. 4, 1998

(51) Int. Cl.[7] ............................................... G06F 15/173
(52) U.S. Cl. ....................................... 709/224; 709/227
(58) Field of Search ................................ 370/257, 445, 370/447; 709/203, 232, 223, 224, 213, 245, 227; 713/2; 324/765; 361/809; 714/46, 47, 48, 25, 724

(56) References Cited

U.S. PATENT DOCUMENTS

| | | | |
|---|---|---|---|
| 5,227,778 A | * 7/1993 | Vacon et al. ............ | 370/445 X |
| 5,278,829 A | * 1/1994 | Dunlap ..................... | 370/257 |
| 5,434,775 A | 7/1995 | Sims et al. | |
| 5,568,612 A | * 10/1996 | Barrett et al. ............... | 709/203 |
| 5,604,869 A | * 2/1997 | Mincher et al. ............ | 709/232 |
| 5,640,504 A | * 6/1997 | Johnson, Jr. ............... | 713/2 X |
| 5,696,895 A | 12/1997 | Hemphill et al. | |
| 5,715,404 | 2/1998 | Katseff et al. | |
| 5,748,642 A | * 5/1998 | Lesmeister ................. | 714/724 |
| 5,862,040 A | * 1/1999 | Adnan ........................ | 361/809 |
| 5,954,827 A | * 9/1999 | Frank et al. .................. | 714/48 |
| 6,028,439 A | * 2/2000 | Arkin et al. ................. | 324/765 |
| 6,101,194 A | * 8/2000 | Annapareddy et al. ..... | 370/447 |
| 6,128,658 A | * 10/2000 | McLean ..................... | 709/224 |
| 6,167,537 A | * 12/2000 | Silva et al. .................. | 714/46 |

FOREIGN PATENT DOCUMENTS

WO        WO 97/50034        12/1997

OTHER PUBLICATIONS

"Proceedings Rf Expo East", published 1991, RF Design, pp. 111 to 121, W.F. Walls, "RS232 Communication for Turn–Key Test Stations".

"International Test Conference 1986 Proceedings. Testing's Impact on Design and Technology", published 1986, IEEE Comput. Soc. Press, pp. 65–73, W.W. Bust, et al., "ABNER–A Burn–In Monitor And Error Reporting System For PBX Systems Test".

* cited by examiner

*Primary Examiner*—Patrice Winder
(74) *Attorney, Agent, or Firm*—Haynes and Boone, LLP

(57) ABSTRACT

A dynamic listener server architecture in which a DUT broadcasts a network package onto a LAN and each of a set of listener servers connected to the LAN responds to the DUT broadcast with an individual packet containing its network address. The DUT receives these packets and uses the first one it receives as the primary listener server until a subsequent broadcast by the DUT when either the DUT is rebooted and assumes itself in an unknown LAN or when the connection to the selected listener server fails and it is now looking for another listener server on the same LAN. The network address of the selected listener server is cached by the DUT and used in repeated sessions.

18 Claims, 1 Drawing Sheet

DYNAMIC BURN RACK MONITOR
LISTENER SERVER

This application relates to co-pending U.S. patent application Ser. No. 09/150,800, filed on Sep. 10, 1998, entitled AUTOMATIC LOCATION DETERMINATION OF DEVICES UNDER TEST, naming Subhashini Rajan and Roger Wong as inventors. The co-pending application is incorporated herein by references in its entirety, and is assigned to the assignee of this invention.

This application relates to co-pending U.S. patent application Ser. No. 09/177,420, filed on Oct. 22, 1998, entitled TROUBLESHOOTING COMPUTER SYSTEMS DURING MANUFACTURING USING STATE AND ATTRIBUTE INFORMATION, naming Subhashini Rajan, Roger Wong and Richard D. Amberg as inventors. The co-pending application is incorporated herein by references in its entirety, and is assigned to the assignee of this invention.

BACKGROUND

The disclosures herein relate generally to building computer systems and more particularly to the preparation of build-to-order computer systems.

A present trend among some computer manufacturers is to provide a customer with a custom-built, or "build-to-order," computer system in which the customer has designated that certain components and capabilities are to be included in the system being ordered. It is therefore important to maximize efficiency at every step of the build-to-order process. That efficiency begins at the time the order is placed and processed, and continues throughout the assembly, testing, and shipment of the custom-built unit.

During production of built-to-order computer systems, specific components for a computer are pulled from stock and taken to an assembly pod where those specific components are assembled in the computer chassis. Following assembly, the chassis is moved to a quick-test area where tests are conducted to quickly determine whether the correct components for that order are installed, and whether the components are operative.

Following the quick test procedure, assembled chassis are moved to a burn rack where the parts are "burned in" and where operational errors may be detected. Many units are simultaneously tested on the burn racks and the tests may take a couple of hours to complete. With many units in production waiting to be tested, it is important that the burn rack spaces available for testing are used efficiently. Therefore, it is important that the computers or devices under test ("DUTs") are tested in a manner that quickly and efficiently determines whether a DUT is satisfactorily operational and if not, that quickly and efficiently determines operational deficiencies so that the DUT may be removed from the burn rack to free up the occupied burn rack space for another DUT to be tested.

While the DUT is on the burn rack, the DUT also communicates with one or more predefined "listener servers" or "listeners". A listener server is a listening process on a local area network ("LAN") that accepts network packets, usually containing status reports, from the DUTs, and stores data received from the DUTs in a centralized database. Because the listeners are predefined, i.e., they constitute a static list of servers on the LAN, if one of the listener servers goes down, a DUT that had been communicating therewith will look for another listener in sequence. If another listener is not available, the data from the DUT will not be recorded in the centralized database. Also, as the number of DUT's increase, a listener may become overloaded, also causing data to not be recorded.

Therefore, what is needed is a listener architecture that prevents DUTs from having to go through a sequential list of listeners to find an available listener, but rather permits the DUT to communicate directly with the first available listener on the LAN, regardless of where in the sequential list the listener falls.

SUMMARY

One embodiment, accordingly, is a dynamic listener server architecture in which a DUT broadcasts a network package onto the LAN and each of a set of listener servers connected to the LAN responds to the DUT broadcast with an individual packet containing its network address. The DUT receives these packets and uses the first one it receives as the primary listener server until a subsequent broadcast by the DUT when either the DUT is rebooted and assumes itself in an unknown LAN or when the connection to the selected listener server fails and it is now looking for another listener server on the same LAN. The first situation occurs when the DUT is being moved from one location (e.g., the burn rack) to another (e.g., an electrical and mechanical repair ("EMR") station). The network address of the selected listener server is cached by the DUT and used in repeated sessions.

It will be recognized that as the number of communications, or DUT clients, being handled by a particular listener server increases, the time it will take that listener server to respond to a DUT broadcast will also increase. The dynamic nature of this behavior ensures that the first listener server to respond to the DUT broadcast has the resources to handle the new DUT.

A principal advantage of this embodiment is that it enables real time, fault-tolerant data collection from the manufacturing floor. In addition, data will automatically route to a new listener server if the current listener server is disconnected or goes down. Furthermore, data will automatically route to a new database if the current database is down.

DETAILED DESCRIPTION

Figure 1:
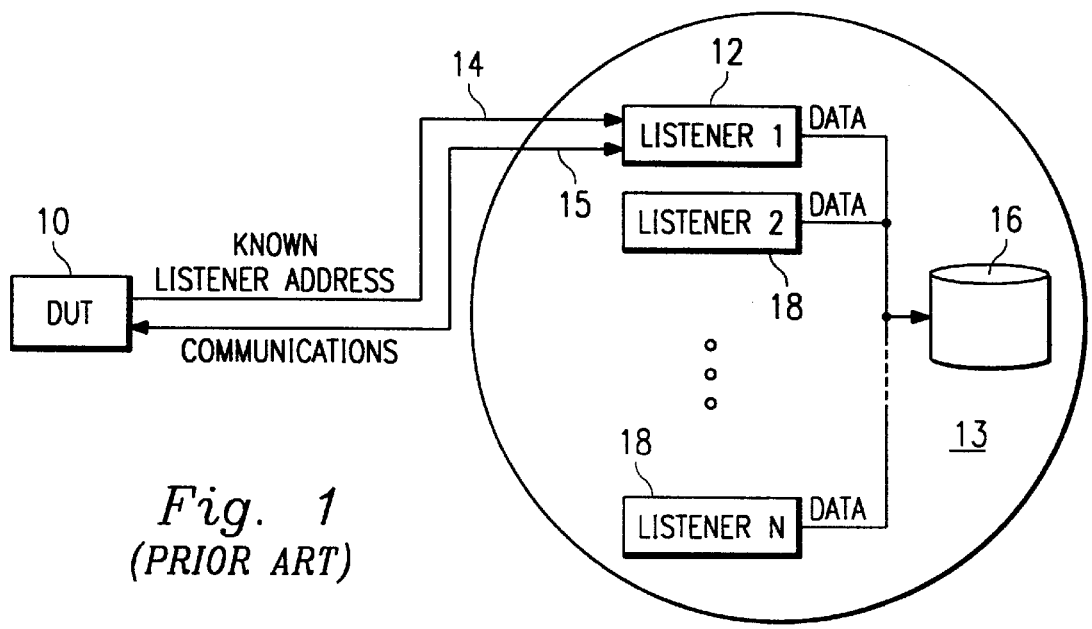
FIG. 1 is a block diagram of a static listener architecture in accordance with the prior art.

FIG. 1 illustrates a static listener architecture in accordance with the prior art. As shown in FIG. 1, a DUT 10 polls a first listener server 12 located in a LAN 13 at a known network address, as indicated by a line 14, and then, upon a response from the listener server 12, commences communications with the listener server 12, as indicated by a line 15. The listener server in which the DUT 10 is in communications is referred to as the "primary listener." In FIG. 1, the listener server 12 is the primary listener. Data resulting from the communications between the DUT and listener server is stored in a database 16 in a conventional manner. If for some reason, communication with the listener server 12 ceases, the DUT 10 polls remaining listener servers 18, using their respective network addresses, one at a time in sequential order until one is found to be available and communication with that listener server commences.

Figure 2:
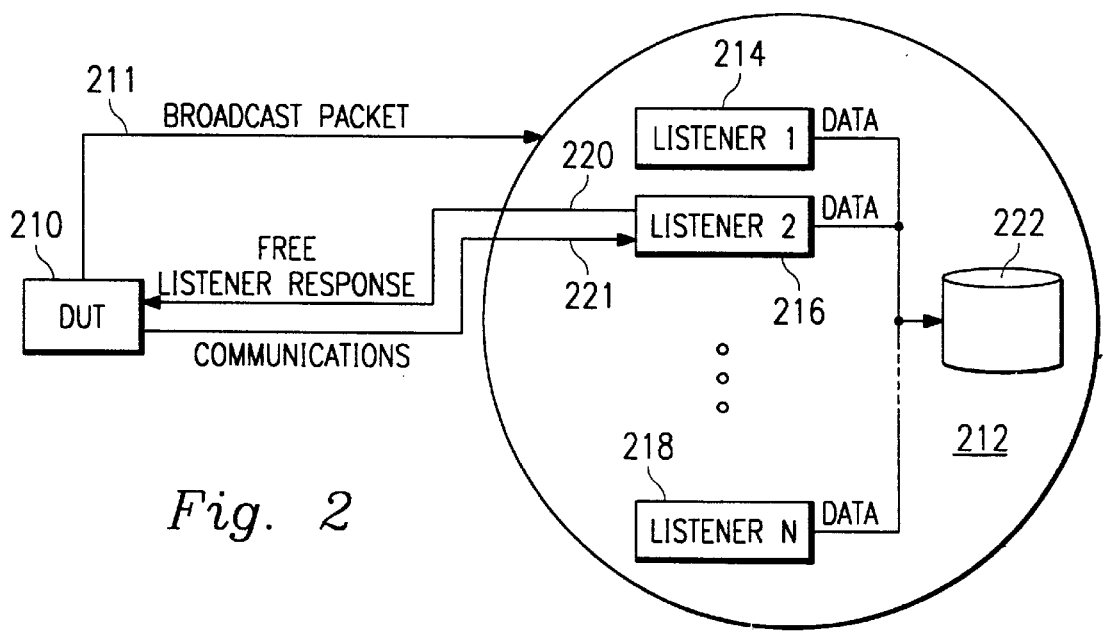
FIG. 2 is a block diagram of a dynamic listener architecture in accordance with one embodiment.

FIG. 2 illustrates a dynamic listener server architecture embodying features of a preferred embodiment. As shown in FIG. 2, a DUT 210 broadcasts a network package, as indicated by a line designated by a reference numeral 211, to a LAN 212 on which a plurality of listener servers, such as listener servers 214, 216, 218, reside at known addresses. Upon receipt of the network package 211, each of the listener servers responds to the DUT with a packet of its own containing, among other things, its respective network address. Upon receipt of the first response, as represented by a line 220, the DUT 210 begins communication with the listener server at the address indicated in the response. In the embodiment illustrated in FIG. 2, the listener server 216 was the first to respond and the DUT 210 establishes communications with the listener server 216 as the primary listener. As described above, data resulting from the communications between the DUT 210 and the primary listener, as represented in FIG. 2 by a line 221, is stored in a database 222 in a conventional manner.

The network address of the listener server 216 is cached by the DUT 210 and used in repeated sessions until the next broadcast is sent; that is, until either the DUT 210 is rebooted and assumes itself in an unknown LAN or the connection to the primary listener 216 fails and the DUT must seek another listener server on the same LAN 212.

It will be recognized that, although only three listeners 214, 216, 218, and one DUT 210 are shown in FIG. 2, it is anticipated that there will be a number of DUTs in communication with any number of listeners in the manner described above.

As a result, one embodiment provides a dynamic listener server system including a plurality of listener servers electrically connected to a LAN. A DUT is electrically connected to the LAN. The DUT broadcasts onto the LAN a network packet including a request to communicate with one of the listener servers. Responsive to receipt of the packet, each of the listener servers responds to the DUT with a network address of the listener server. The DUT commences communication with a first one of the listener servers to respond with the network address.

Another embodiment provides apparatus for monitoring a DUT electrically connected to a LAN to which a plurality of listener servers for monitoring the DUT are also electrically connected. The apparatus includes means for causing the DUT to broadcast a network packet onto the LAN, means responsive to receipt of the network packet for causing each of the listener servers to respond to the network packet with a network address of the listener server, and means responsive to receipt of a first one of the network addresses for causing the DUT to establish communications with a primary listener server including the listener server at the first one of the network addresses received by the DUT.

A further embodiment provides a method of monitoring a DUT by electrically connecting the DUT to a LAN to which a plurality of listener servers for monitoring the DUT are also electrically connected. The DUT broadcasts a network packet to the LAN. Responsive to receipt of the network packet, each of the listener servers respond to the network packet with a network address of the listener server. Responsive to the receipt of a first one of the network addresses, the DUT establishes communications with a primary listener server including the listener server at the first one of the network addresses received by the DUT.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A dynamic listener server system comprising:
   a plurality of listener servers electrically connected to a local area network ("LAN");
   a burn rack; and
   a device under test ("DUT") electrically connected to said LAN and said burn rack;
   wherein said DUT broadcasts onto said LAN a network packet comprising a request to communicate with one of said listener servers;
   wherein responsive to receipt of said packet, each of said listener servers responds to said DUT with a network address of said listener server; and
   wherein said DUT commences communication with a first one of said listener servers to respond with said network address to cause data to be stored in a database.

2. The system of claim 1 further comprising a plurality of DUTs connected to said LAN and wherein each of said DUTs broadcasts onto said LAN a network packet comprising a request to communicate with one of said listener servers.

3. The system of claim 2 wherein responsive to receipt of each of said packets, each of said listener servers responds to said DUT identified by said packet with a network address of said listener server and said DUT commences communication with a first one of said listener servers to respond with said network address.

4. The system of claim 1 wherein said DUT is a computer system.

5. The system of claim 1 wherein said first one of said listener servers to respond with said network address functions as a primary listener server for said DUT.

6. The system of claim 5 further comprising the database electrically connected to said LAN for storing data communicated by said DUT to said primary listener server.

7. A method of monitoring a device under test ("DUT"), comprising:
   electrically connecting said DUT to a burn rack;
   electrically connecting said DUT to a LAN to which a plurality of listener servers for monitoring said DUT are also electrically connected;
   said DUT broadcasting a network packet on to said LAN;
   responsive to receipt of said network packet, each of said listener servers responding to said network packet with a network address of said listener server;
   responsive to receipt of a first one of said network addresses, said DUT establishing communications with a primary listener server comprising said listener server at said first one of said network addresses received by said DUT to cause data to be stored in a database.

8. The method of claim 7 wherein each of a plurality of DUTs connected to said LAN and said burn rack broadcasts onto said LAN a network packet comprising a request to communicate with one of said listener servers.

9. The method of claim 8 wherein responsive to receipt of each of said packets, each of said listener servers responds to said DUT identified by said packet with a network address of said listener server and said DUT commences communication with a first one of said listener servers to respond with said network address.

10. The method of claim 7 wherein said DUT is a computer system.

11. The method of claim 7 further comprising storing data communicated by said DUT to said primary listener server in the database electrically connected to said LAN.

12. The method of claim 7 further comprising, responsive to a cessation in communications between said DUT and said primary listener server, repeating said broadcasting, responding, and establishing.

13. The method of claim 12 wherein said cessation of communications is caused by a failure in communication between said DUT and said primary listener server.

14. The method of claim 12 wherein said cessation of communications is caused by said DUT being rebooted.

15. A system comprising:
- a plurality of servers;
- a burn rack; and
- a device under test ("DUT") coupled to the burn rack and the plurality of servers and including:
  - means for causing a packet to be broadcast to the plurality of servers; and
  - means for causing communications to be established with one of the plurality of servers to cause data to be stored in a database in response to receiving a network address from the one of the plurality of servers sent in response to receiving the packet.

16. The system of claim 15, further comprising:
- a plurality of DUTs each coupled to the burn rack and the plurality of servers and each including:
  - means for causing a packet to be broadcast to the plurality of servers; and
  - means for causing communications to be established with one of the plurality of servers in response to receiving a network address from the one of the plurality of servers sent in response to receiving the packet.

17. The system of claim 15, wherein the DUT comprises a computer system.

18. The system of claim 15, further comprising:
- means coupled to the plurality of servers for storing the database and data conveyed from the DUT to the one of the plurality of servers.

* * * * *